Aug. 21, 1962 T. J. ZAK 3,050,422
LENS CLEANING PROCESS
Filed Feb. 18, 1960
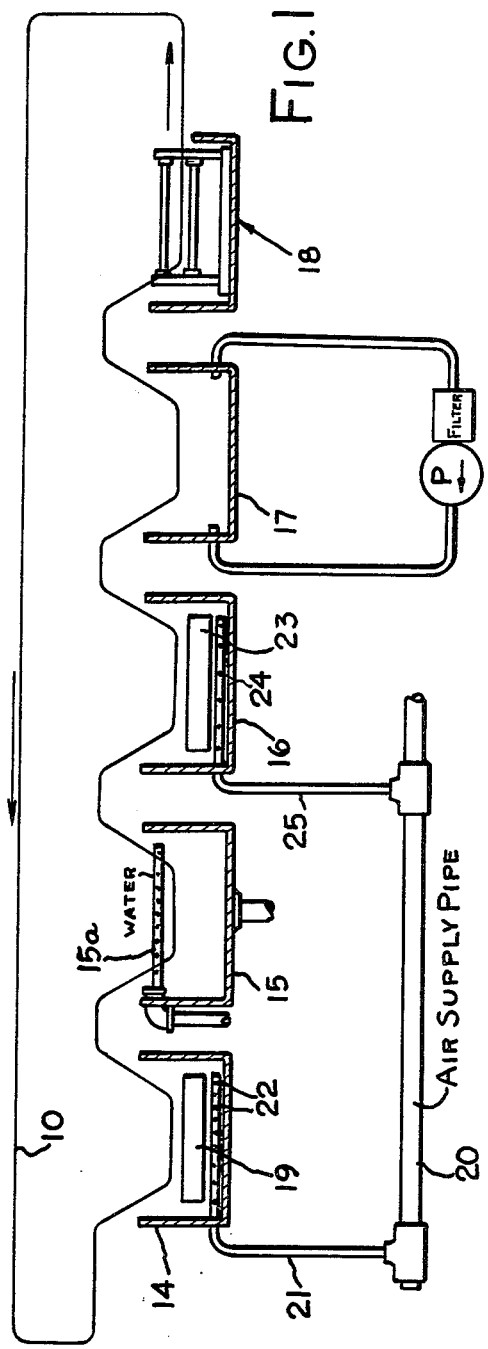
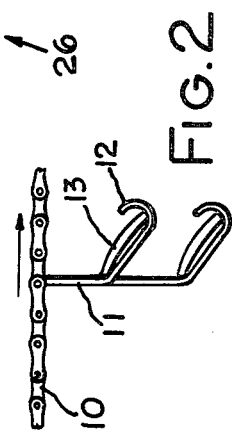
INVENTOR.
THEODORE J. ZAK
BY Frank C. Parker
ATTORNEY United States Patent Office 3,050,422
Patented Aug. 21, 1962

3,050,422
LENS CLEANING PROCESS
Theodore J. Zak, Irondequoit, N.Y., assignor to Bausch & Lomb Incorporated, a corporation of New York
Filed Feb. 18, 1960, Ser. No. 9,571
7 Claims. (Cl. 134—1)

The present invention relates to processes for cleaning glass lenses and is more particularly concerned with a process for removing the residue of a polishing agent and a resinous blocking compound from a glass lens after final grinding and polishing of the lens.

Conventionally, glass lens blanks are mounted upon a metal block with a resinous blocking compound in order to hold the lenses in proper position while they are being ground and polished. After completion of the grinding and polishing operations, the lenses are removed from the blocks, usually by a quickly chilling operation. This is successful in removing the greater portion of the resin from the lenses, however, small particles of resin are likely to remain on the lenses which are difficult to remove. Similarly, during the grinding and polishing operations a polishing agent is utilized, such for example as zirconium oxide, which is known commercially as Zirox-B. It is essential that all traces of this polishing agent be removed from the finished lenses and this also presents considerable difficulty in practice.

The present invention, therefore, has for a principal object the provision of an automatic method of cleaning glass lenses whereby the residue of the polishing agent and the resinous blocking compound which normally adheres to the lenses after the grinding and polishing thereof, is substantially completely removed.

More particularly, it is an object of the present invention to provide a glass lens cleaning process including the step of subjecting the lens to ultrasonic vibrations while they are disposed in a cleaning solution and simultaneously bubbling a gas, which may be air, through the cleaning solution.

A particular advantage of the present invention resides in the fact that the cleaning process is substantially automatic, requiring a minimum of manual handling of the lenses from the time the cleaning operation is commenced until it is concluded.

Other objects and advantages of the present invention will become more apparent from the following detailed description, when read in conjunction with the accompanying drawing, wherein:

FIG. 1 is a schematic illustration of the process or method comprising the subject matter of the present invention; and FIG. 2 is a fragmentary view illustrating the conveyor chain with a pair of glass lenses suspended therefrom.

With reference now to the drawing, the process or method comprising the subject matter of the present invention comprises the steps of first passing the lenses through a cleaning solution and simultaneously subjecting the lenses to ultrasonic vibrations while a gas, such as air, is bubbled through the cleaning solution. Thereafter, the lenses are subjected to a succession of rinsing operations. The first of these rinsing operations comprises a spray rinse. The second rinsing operation comprises passing the lenses through a tank containing deionized water and while the lenses are in this tank, subjecting the same to ultrasonic vibrations and simultaneously bubbling a gas, such as air, through the water. The final rinsing operation comprises passing the lenses through a tank of water containing a small percentage of a nonionic surface active agent which has the effect of making the lenses slippery and facilitating drainage of the water therefrom. Finally, the lenses are passed through an infrared drying apparatus in order to dry the same.

Now referring in detail to the drawing, a conveyor comprising a chain 10 travels in the direction indicated by the arrow and is formed with a plurality of arms 11 which have hooked portions 12 forced thereon for respectively retaining lenses 13 suspended from the conveyor chain 10. The conveyor chain 10 successively conveys the lenses 13 through a plurality of tanks 14, 15, 16 and 17 and thereafter through an infrared drying device 18.

In one operative embodiment of the invention each of the tanks 14 and 16 has a capacity of approximately 25 gallons, whereas the dip tank 17 has a capacity of approximately 18 gallons. It is only necessary that the tank 15 be of a size of sufficient capacity to catch the spray of rinse water which is being applied to the lenses.

When opthalmic glass lenses are being cleaned by the present process in order to remove the residue of resinous blocking compound and the polishing agent therefrom, it has been found that a cleaning solution comprising approximately 11–13 ounces of cleaner per gallon of water maintained at 160° F. is particularly effective. The cleaning compound utilized in such cleaning solution preferably contains approximately 48–60% by weight of a strong alkali of the sodium hydroxide class; 1–3% of an anionic synthetic surface active agent which is stable in the strong alkali; 1–3% of a nonionic synthetic surface active agent stable in the strong alkali; 10–15% of a chelating agent (sodium salt of ethylene diamine tetracetic acid); and 20–40% of a gluconic acid derivative (sodium gluconate, gluconic acid 50%, or glucono delta lactone). An example of the nonionic surface active agent which may be satisfactorily utilized in the cleaning solution comprises alkylpolyoxyethylene ether and an example of the anionic surface active agent which has been found to be satisfactory in the cleaning solution is a sulfated fatty alcohol such as is known commercially as Orvus or Duponol ME.

While the lenses are in the cleaning solution in tank 14, they are subjected to ultrasonic vibrations generated by an ultrasonic transducer 19. In order for there to be sufficient energy for properly activating the transducer, and for properly effecting the cleaning operation, it has been found that approximately 30–60 watts of power should be applied to the transducer per gallon of solution and it has also been found that a transducer with a vibration frequency of approximately 40,000 c.p.s. is particularly effective in the present process.

It has also been found that the cleaning operation carried out in tank 14 is far more effective, in fact critically effected, by passing bubbles of gas, such as air, through the solution. In FIG. 1, an air supply pipe 20 is connected with a branch conduit 21 which leads into tank 14 and a plurality of holes or openings 22, each having a diameter of approximately .0135" is provided for bubbling the air through the cleaning solution. This size holes have been found to be particularly effective in providing the proper size of bubbles through the solution. It has also been found that it is only necessary that the air being bubbled into the tank be under a pressure just great enough to overcome the height of the water in the tank and further that of the order of ⅙ to 1 cubic foot of air should be bubbled into the tank per minute of operation.

The first rinse which takes place in tank 15 merely comprises passing the lenses through a spray of water supplied by a pipe 15a maintained at a temperature of somewhere between 110–175° F.

The second rinsing operation which takes place in tank 16 comprises passing the lenses through a supply of deionized water of a hardness of less than five parts per million, with the water being maintained at a temperature of somewhere between 110 and 175° F. The lenses 13 while being transported through tank 16 are subjected to ultrasonic vibrations generated by a transducer 23 which is substantially identical to the transducer 19 and likewise the water in tank 16 has a continuous supply of air being bubbled thereinto through openings 24 in an air supply conduit 25. It has been found that of the order of ⅛ to 1 cubic foot of air per minute should be bubbled into the tank and the air should be maintained at a pressure in the supply conduit just sufficiently great enough to overcome the height of the column of water in the tank 16.

The last rinsing operation, which is carried out in tank 17 of approximately 18 gallons capacity, comprises dipping the lenses in water having 3–4.5 milliliters of a nonionic surface active agent therein, with the water having a hardness of less than five parts per million and maintained at a temperature between 110–175° F. An example of the nonionic surface active agent which may be used in the tank 17 is alkylpolyoxyethylene ether and which is sold commercially as Cerfak 1400. In order to maintain the purity of the water in the dip tank 17, a pump and filter designated by reference numeral 26 is continually operated for cleaning and filtering the water.

After the rinsing of the lenses which takes place in the dip tank 17, they are conveyed through a conventional infrared dryer 18.

It has been found that when the present process for cleaning lenses is utilized for cleaning ophthalmic lenses, the cleaning solution in tank 14 may be approximately pH 13.5, however, an alkaline cleaning solution of this high a degree of alkalinity etches the glass to some slight extent and it is necessary when cleaning glass lenses to be used for optical instruments that the alkalinity be held to approximately pH 9 or less. However, in both instances it has been found that the simultaneous subjection of the lenses to ultrasonic vibrations and passing bubbles of gas through the solution is particularly effective in removing the resinous residue and the residue of the polishing agent which remains on the lenses after final grinding and polishing thereof.

It is contemplated that numerous changes and modifications may be made in the present invention without departing from the spirit or scope thereof.

What is claimed is:

1. The method of cleaning glass lenses comprising ultrasonically vibrating the lenses while they are disposed in a strong alkaline solution containing at least 48 percent by weight of a strong alkali and simultaneously bubbling air through said solution.

2. The method of cleaning glass lenses comprising ultrasonically vibrating the lenses while they are disposed in a solution containing a strong alkali, wetting agents, a chelating agent and an inhibitor for minimizing etching of the lenses, and simultaneously bubbling air through said solution.

3. The method of removing the residue of a polishing agent and a resinous blocking compound from glass lenses after final grinding and polishing of the lenses and comprising subjecting the lenses to ultrasonic vibrations while they are disposed in an aqueous cleaning solution containing a strong alkali, wetting agents, a chelating agent and an inhibitor for minimizing etching of the lenses and simultaneously bubbling air through said cleaning solution, and thereafter subjecting said lenses to successive rinsing operations including a deionized water rinse wherein the lenses are subjected to ultrasonic vibrations while air is bubbled into the rinse water.

4. The method of cleaning glass lenses after final grinding and polishing thereof and comprising subjecting the lenses to ultrasonic vibrations while they are disposed in an aqueous solution containing a strong alkali, wetting agents, a chelating agent and an inhibitor for minimizing etching of the lenses, and simultaneously bubbling air through said cleaning solution, and thereafter subjecting said lenses to successive rinsing operations comprising, in sequence, a water spray, subjecting the lenses to ultrasonic vibrations while being dipped in deionized water into which air is being bubbled, and finally rinsing said lenses in water containing a small percentage of a nonionic surface active agent for facilitating draining of the water from the lenses.

5. The method of cleaning glass lenses after final grinding and polishing thereof and comprising subjecting the lenses to ultrasonic vibrations while dipped in an aqueous cleaning solution into which air is being bubbled and thereafter subjecting said lenses to successive rinsing operations including subjecting the lenses to ultrasonic vibrations while being dipped in deionized water into which air is being bubbled, and dipping said lenses in water containing a small percentage of a nonionic surface active agent for facilitating draining of the water from the lenses.

6. The method of cleaning glass lenses comprising disposing the glass lenses in a strong alkaline solution containing at least 48 percent by weight of a strong alkali while the solution is being subjected to ultrasonic vibration, and simultaneously bubbling air through said solution.

7. The method of cleaning glass lenses comprising disposing the glass lenses in a solution containing a strong alkali, a wetting agent, a chelating agent and an inhibitor for minimizing etching of the lenses, while the solution is being subjected to ultrasonic vibration and simultaneously bubbling air through said solution.

References Cited in the file of this patent

UNITED STATES PATENTS

| | | |
|---|---|---|
| 2,385,264 | Ferris | Sept. 18, 1945 |
| 2,702,260 | Massa | Feb. 15, 1955 |
| 2,784,119 | McCown | Mar. 5, 1957 |

FOREIGN PATENTS

| | | |
|---|---|---|
| 548,960 | Great Britain | Oct. 30, 1942 |

UNITED STATES PATENT OFFICE
CERTIFICATE OF CORRECTION

Patent No. 3,050,422                       August 21, 1962

Theodore J. Zak

It is hereby certified that error appears in the above numbered patent requiring correction and that the said Letters Patent should read as corrected below.

Column 1, line 18, for "quickly" read -- quick --; line 70, for "drainage" read -- draining --; column 2, line 4, for "forced" read -- formed --.

Signed and sealed this 19th day of February 1963.

(SEAL)
Attest:

ESTON G. JOHNSON
Attesting Officer

DAVID L. LADD
Commissioner of Patents